G. H. LEE.
HUMIDOR.
APPLICATION FILED JULY 27, 1909.

963,592.

Patented July 5, 1910.

WITNESSES
Edward Thorpe

INVENTOR
George H. Lee
BY
Munn & Co
ATTORNEYS

UNITED STATES PATENT OFFICE.

GEORGE HOWARD LEE, OF OMAHA, NEBRASKA.

HUMIDOR.

963,592. Specification of Letters Patent. Patented July 5, 1910.

Application filed July 27, 1909. Serial No. 509,852.

*To all whom it may concern:*

Be it known that I, GEORGE HOWARD LEE, a citizen of the United States, and a resident of Omaha, in the county of Douglas and State of Nebraska, have invented a new and Improved Humidor, of which the following is a full, clear, and exact description.

Among the principal objects which the present invention has in view are to provide a humidor for supplying moisture to heated air, and to provide a device for regulating the amount of moisture given off.

Reference is to be had to the accompanying drawings, forming a part of this specification, in which similar characters of reference indicate corresponding parts in all the views, and in which—

Figure 1:
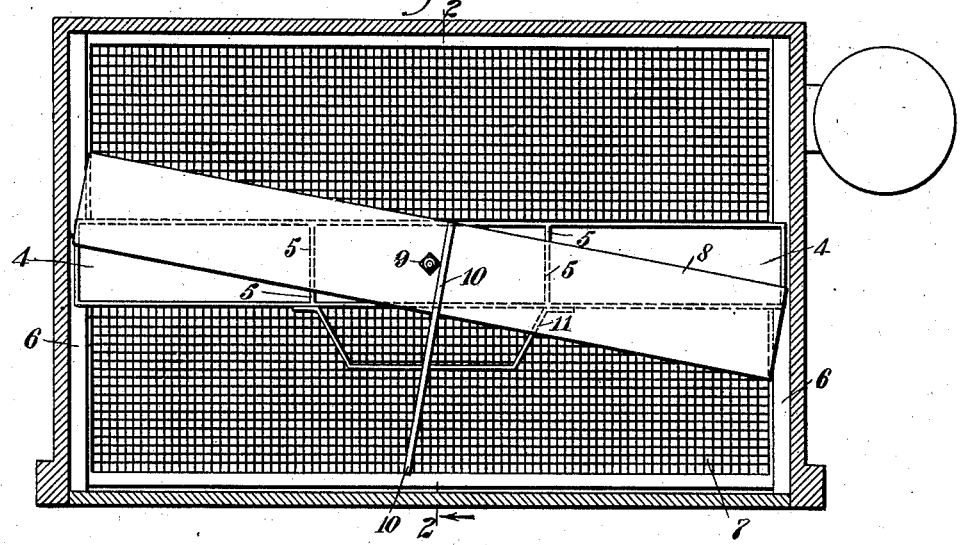
Figure 2:
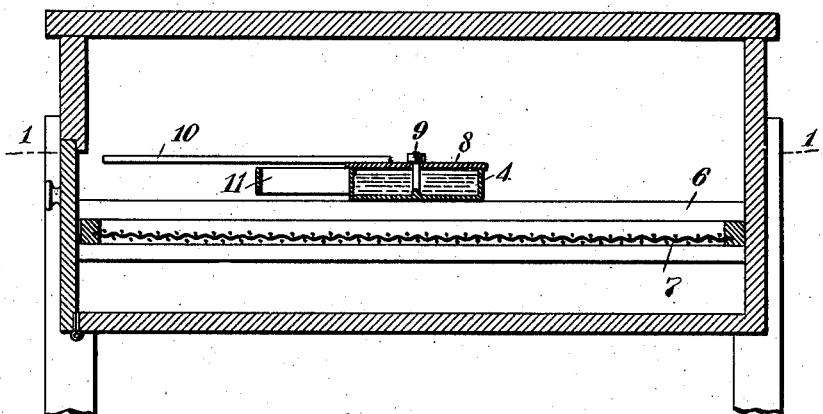
Figure 3:
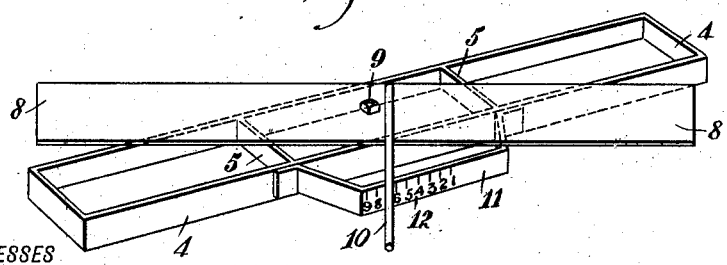

Figure 1 is a plan view of the humidor constructed in conformity with the present invention shown in its application to an incubator, the incubator being shown in section taken on the line 1—1 in Fig. 2; Fig. 2 is a vertical cross section of the humidor and incubator containing the same, the section being taken on the line 2—2 in Fig. 1; and Fig. 3 is a perspective view of the humidor, showing the cover of the same partly displaced and the scale used in connection therewith.

The humidor consists in an elongated, shallow pan 4. This may be formed as a continuous piece or may, as shown in the accompanying drawings, be divided by the partition 5—5. The humidor is supported within the incubator chamber by the rails 6—6 just above the egg tray 7. The cover 8 is adapted to fully cover the pan 4 and is secured thereto by a bolt 9 fixedly attached to the bottom of the pan 4. The bolt 9, by this construction, forms a pivot upon which the cover 8 is swung. Fixedly attached to the cover 8 is a handle 10 which is extended horizontally from the said cover and rides over and upon the extended scale-bearing member 11. The scale-bearing member consists of a flat piece of metal bent to the desired shape and fixedly secured to the side of the pan 4. Upon the outer surface of the member 11 is impressed or imprinted a series of numerals or other designating marks 12, indicating stations for the location of the handle 10.

By means of the construction whereby the pan 4 is divided by the partitions 5—5 into three compartments, it will be noticed that the middle compartment is exposed by the cover 8, very slightly, in comparison with the compartments formed at the ends of the pan 4. By this arrangement the evaporation from the middle compartment is retarded so that it is possible for the compartments at the ends of the humidor to become exhausted and dry, while the middle compartment yet contains an abundant supply of water, which, answering to the greater demand of the increasing absorption of the air will supply the needed moisture until the neglect on the part of the owner or operator has been remedied by supplying all of the compartments with the needed quantity of water.

By operating the cover with reference to the scale 12 the same supply of moisture may at any time be duplicated, which at a former time gave desired results. The scale 12 permits the reproduction at any time of a former condition of the humidor within the incubator, or the reproduction of the former conditions for the operation of the incubator.

The operation of a humidor of the construction specified is obvious. When placing any humidor within the chamber, care is taken that the scale 12 shall be presented to the door of the chamber and that the handle 10 is placed in a position readily accessible from the open door.

Having thus described my invention, I claim as new, and desire to secure by Letters Patent:—

1. A humidor comprising a plurality of serially arranged liquid receptacles; and a single cover for said receptacles, said cover being pivotally mounted on one of said receptacles at a point removed from the adjacent receptacles to unequally expose the contents of said receptacles when the said cover is shifted.

2. A humidor, comprising an elongated, shallow pan divided into separate compartments, in the center one of which is erected a pivot, and a cover mounted upon said pivot and adapted to swing thereon to expose said compartments in unequal degree.

3. A humidor, comprising an elongated pan divided into separate compartments, a cover pivotally mounted upon said pan at the medium line thereof, a member having scale markings fixedly mounted upon said pan, in relation to said cover, to show the open position of said cover.

4. A humidor, comprising an elongated pan divided into separate compartments by suitable partitions, a cover for said pan, pivotally connected to said pan at the medium line thereof to expose the said compartments in a varied degree, a scale-bearing member fixedly attached to said pan, projected from the side thereof toward the door of the incubating chamber, and a handle attached to said cover.

In testimony whereof I have signed my name to this specification in the presence of two subscribing witnesses.

GEORGE HOWARD LEE.

Witnesses:
 HARRY ROWLEY,
 HELEN M. DAILEY.